No. 741,294. PATENTED OCT. 13, 1903.
H. B. BARTLETT.
LINOTYPE MACHINE.
APPLICATION FILED JUNE 21, 1902.
NO MODEL. 6 SHEETS—SHEET 1.

No. 741,294. PATENTED OCT. 13, 1903.
H. B. BARTLETT.
LINOTYPE MACHINE.
APPLICATION FILED JUNE 21, 1902.
NO MODEL. 6 SHEETS—SHEET 2.

No. 741,294. PATENTED OCT. 13, 1903.
H. B. BARTLETT.
LINOTYPE MACHINE.
APPLICATION FILED JUNE 21, 1902.
NO MODEL.
6 SHEETS—SHEET 5.
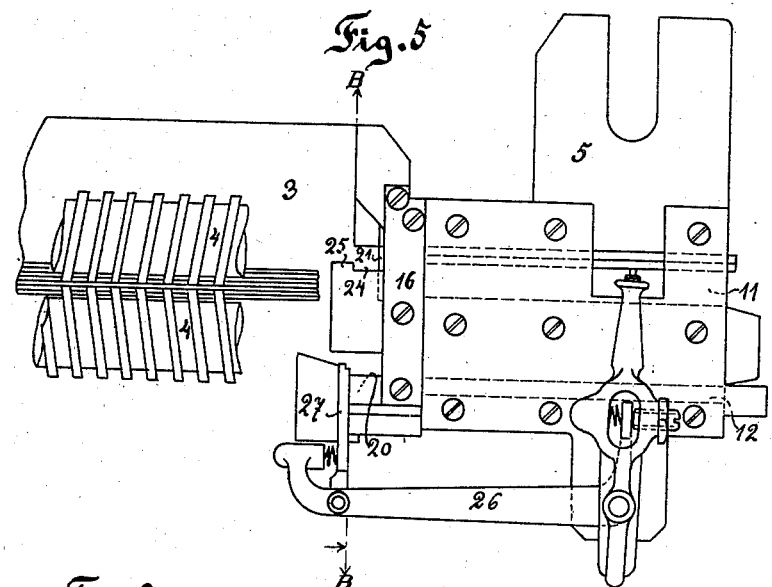
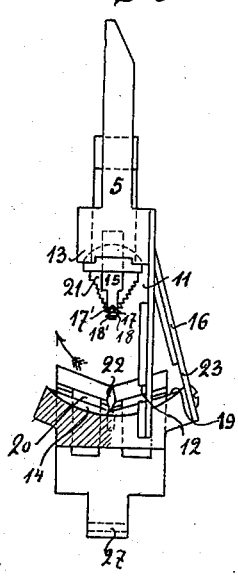
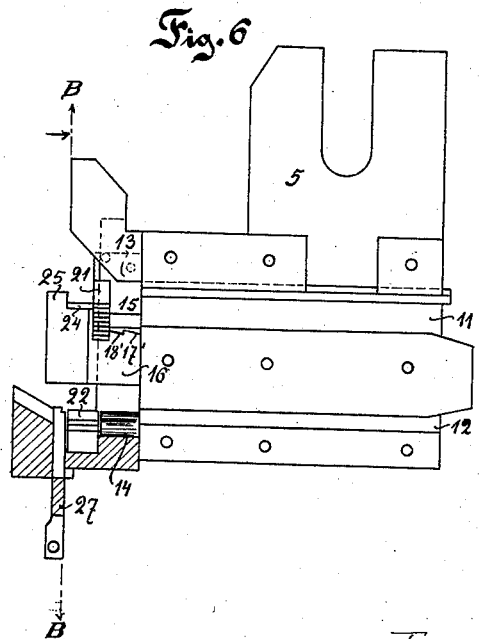
Witnesses:
Inventor
Henry B. Bartlett No. 741,294. PATENTED OCT. 13, 1903.
H. B. BARTLETT.
LINOTYPE MACHINE.
APPLICATION FILED JUNE 21, 1902.
NO MODEL.
6 SHEETS—SHEET 6.

No. 741,294. Patented October 13, 1903.

UNITED STATES PATENT OFFICE.

HENRY B. BARTLETT, OF BERLIN, GERMANY.

LINOTYPE-MACHINE.

SPECIFICATION forming part of Letters Patent No. 741,294, dated October 13, 1903.

Application filed June 21, 1902. Serial No. 112,590. (No model.)

*To all whom it may concern:*

Be it known that I, HENRY B. BARTLETT, a citizen of the United States of America, residing at Berlin, Germany, have invented new and useful Improvements in Linotype-Machines, of which the following is a specification.

The present invention has reference to improvements in linotype-machines, and relates more especially to improvements in devices for distributing and releasing various sorts of matrices in linotype-machines.

In linotype-machines of the ordinary construction having matrices carrying the negative letters serving for founding the matrices for the purpose of distribution and correct disposal in the magazine-channels, according to the number of various kinds of matrices used, are suspended vertically on one or more distributing-rules. In such machines there is one distributing-rule for each kind of matrix. A great defect attaching to these machines is that without changing the magazine only a limited number of kinds of matrices can be handled at the same time. Another disadvantage is the complicated construction of the distributing device, which is rendered necessary by reason of the separated position of the magazine.

The subject of the present invention is a device for distributing and releasing various sorts of matrices in linotype-machines by means of a distributing-rule, the defects referred to being overcome by the matrices being provided with an eccentric arrangement of teeth and after being raised into the distributing-box and pushed forward are farther advanced in a prolongation of the latter, whereby the individual matrices, according to the character, are so arranged by turning that the various sorts hang at any desired angle at both sides of the distributing-rule and in this slanting position are conducted along the distributing-rule by the usual spindles into the several magazines located below the rule, one behind the other. The magazines are provided with detaching devices for the matrices connected together so that only only one sort of matrix can be detached from a magazine.

Figure 1:
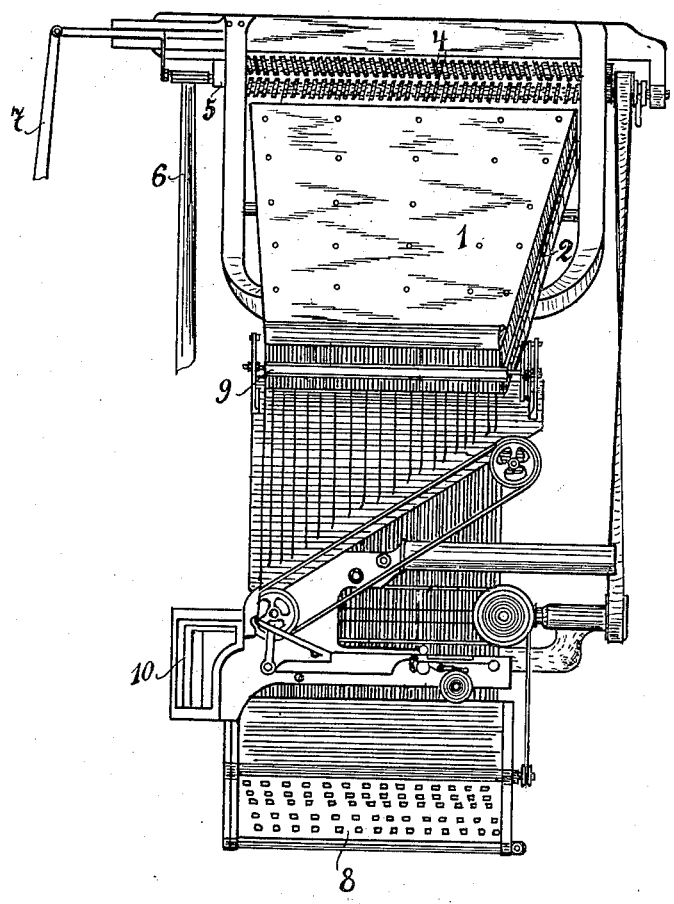
Figure 2:
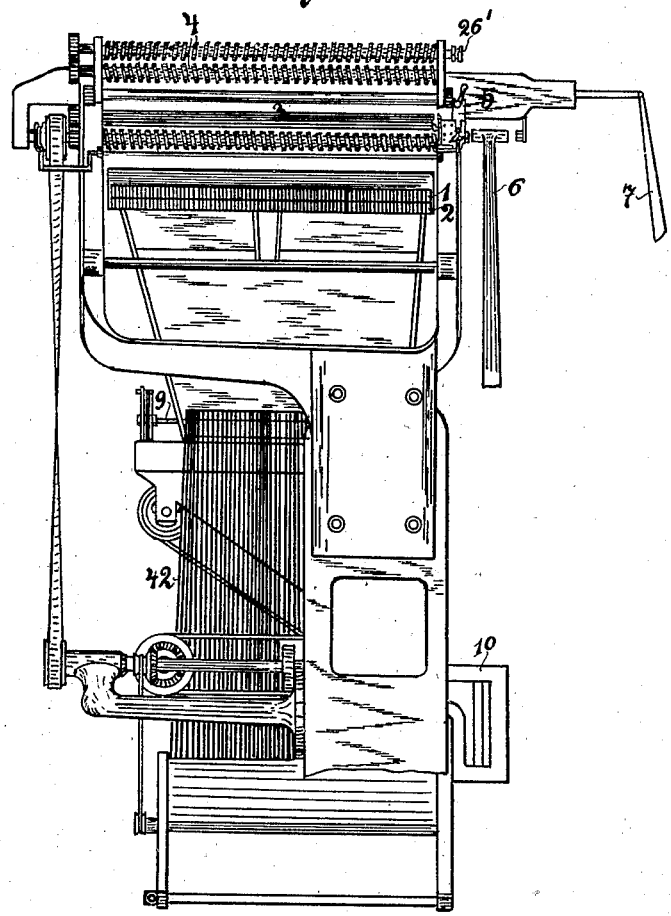
Figure 3:
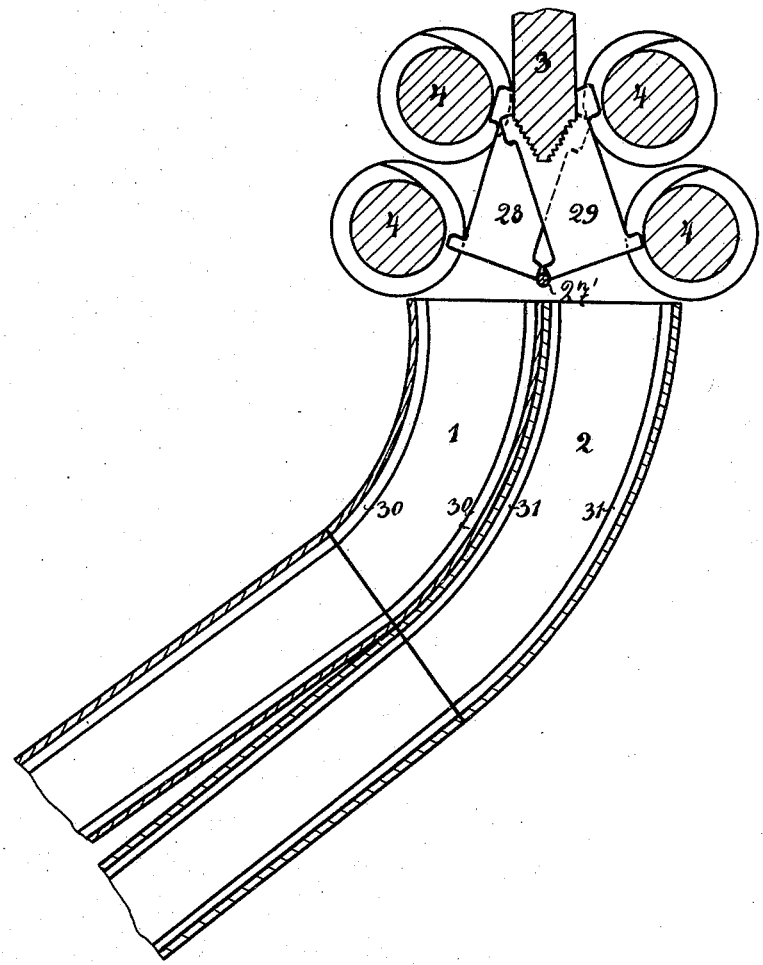
Figure 4:
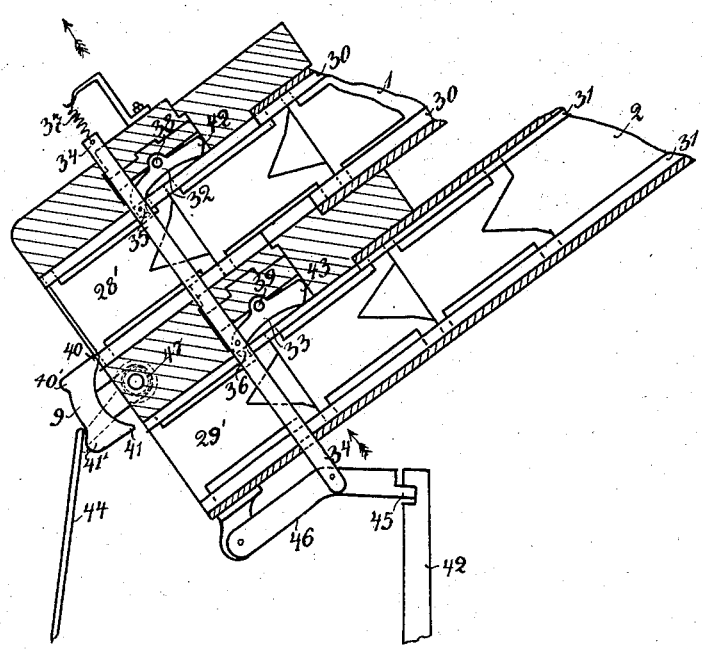
Figure 8:
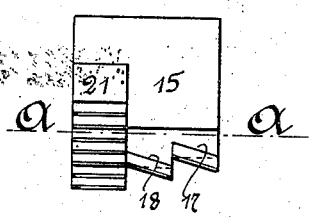
Figure 9:
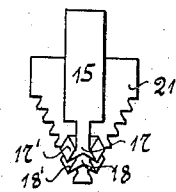
Figure 10:
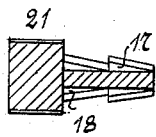
Figure 11:
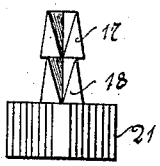
Figure 12:
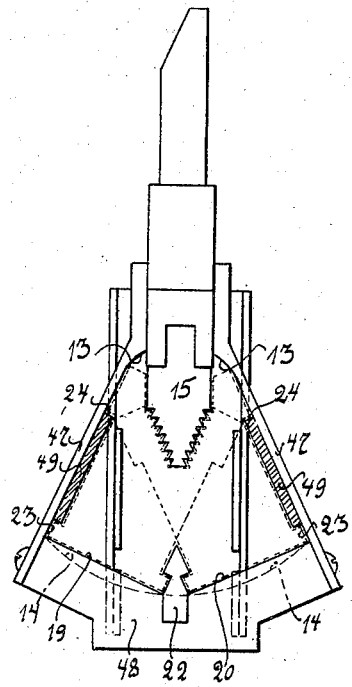

In order to make the invention more readily understood, I have illustrated it on the accompanying drawings, Figure 1 of which shows in elevation the arrangement of a device of this kind on a linotype-machine with two magazines. Fig. 2 is a rear view of the same. Fig. 3 shows in cross-section, partly broken away, the distributing-rule with cooperating-spindles and the top part of two magazines. Fig. 4 shows in cross-section the corresponding bottom part with distributing devices for the matrices. Fig. 5 is a side elevation of the distributing-box with device for turning the matrices. Fig. 6 is a longitudinal section, and Fig. 7 a rear view of the same. Fig. 8 shows a part of the turning device in side elevation. Fig. 9 is a front view of this part. Fig. 10 is a section on the line A A of Fig. 8. Fig. 11 is a bottom view of the part shown in Fig. 9, and Fig. 12 is a front view of the turning device looking from the line B B on Fig. 5.

1 and 2 are the two magazines.

3 is the distributing-rule, and 4 the distributing-spindles.

5 is the distributing-box; 6, the elevator for conveying the matrices out of the galley 10 in the distributing-box 5, and 9 is the stop for the magazine for the purpose of disengaging the magazine not in use for the time being.

In the distributing-box 5, Figs. 5 to 7, 11 and 12 are the grooves in which the matrices slide under pressure of the distributing-carriage 7. At the end of the box is a prolongation or extension 16, formed by two side pieces 47, which are fixed with the upper end at the distributing-box. Between the lower ends is arranged a bottom piece 48, Fig. 12. The side parts 47 are provided with metal plates 49 as guide. The surfaces 24 of these plates finish in projections 25. The side parts 47 at the top are formed to arcs 13, between which is arranged the guide 15, Figs. 8 to 11. This guide 15 is provided with a short rack 21 and two rearwardly ascending and widening projections 17 and 18, by which projections 17 18 the turning of the matrices is effected. The bottom piece 48 is formed inwardly to an arc 14, which arc continues in surfaces 19 20, inclined at a certain angle to each other, so that the arc 14 is vertical under the projections 17 18 and the surfaces 19 20 are under the rack 21.

22 is a guide-piece for the lower inner lugs of the matrix. The piece 22 is arranged in the bottom piece 48, Fig. 12, between the surfaces 19 20. The metal plates 49 form, with the side pieces 47 and the surfaces 19 20 of the bottom 48, a guide 23 for the lower exterior lugs of the matrix.

26 is a lever which, actuated by a cylinder with a curviform groove 26', Fig. 2, by means of a member 27, conveys the matrices singly held by the projections 25 to the spindles 4. The matrices 28 29, suspended from the rule 3, Fig. 3, are conducted with the lower inner lugs along a guide—e. g., a wire 27'—with lower inner lugs and reach the channels 30 31 of the magazine 1 2, in which at the exit detents 32 33 are provided, pivoted at 38 39. The detents are hooked at one end and are chamfered off at the opposite end 42 (or 43.) An intermediate link—e. g., a bar 34—is pivoted to the hooks 35 36, actuated by a spring 37 in the direction of the arrow, Fig. 4, when a bar 42 of the keyboard 8 of the machine releases the nose 45 of a lever 46, jointed to the bar 34.

44 is a guide-plate for the released matrices of the upper magazine, if it is engaged. The plate 44 is arranged before the channel-outlet, so that the plate 44 in the reversing of the revolving stop 9, which is arranged likewise before the channel-outlet between the magazine, is engaged by the stop 9. For this purpose the guide-plate 44 is arranged rotary at both sides of the magazine on lugs 47 of the stop 9. The stop 9 is provided with two lugs 40' 41', which in turning the stop 9 are connected with the plate 44, so that if the upper magazine is disengaged the plate 44 is elevated and the channel-outlets of the under magazine set free. If the under magazine is disengaged, the plate 44 is in the lowest position and forms, with the even surface of the stop 9, an even downward-inclined plane.

The operation of the machine is as follows: The line of matrices set up in the galley 10 is brought before the casting-pot in the usual manner, cast, and raised by the elevator 6 into the box 5, in which the line is advanced by the carriage 7. In this ordinary manner the matrices, without regard to their different eccentricity of teeth, are arranged with their broad sides together in such manner that the ends (narrow sides) lying uniformly form a flat surface. On their passage through the distributing-box the matrices are turned by the guide 15, mounted in the prolongation 16, which guide 15 is secured exactly at the center of the box. As the teeth of the matrices are arranged eccentrically to the center line of the matrices, on the advance of the latter, according to the eccentricity of the teeth, the part 15 with its projections 17 18 will exercise a pressure on the gaps between the teeth of the matrices, which compels the latter to turn in the direction of pressure, according to the form of the arc determined by the surfaces 13 and 14. If, for instance, a matrix with right-handed teeth is conducted through the prolongation 16, the surface 17' of the projection 17 will engage in a certain gap formed by the teeth of the left-hand row of teeth. On their passage through the prolongation 16 the matrices, owing to the increasing pressure of the surface 17', which spreads rearward, will be turned in the direction of the arrow, Fig. 7, and on their further passage in the same direction, owing to the surface 18' engaging in the next deeper-lying gap, since the different sorts of matrices have teeth of different eccentricity, the individual matrices are turned in various directions, so that the various sorts are separated from each other and arranged. After their passage through the prolongation 16 the matrices, sliding on the rack 21 onto the surfaces 19 20 and guided on their lugs in the grooves of the guide 22 and into the guides 23 24, are advanced to the projection 25, from which they are transferred singly by lifting by means of the member 27 onto the two sides of the bar 3 by the spindles 4. The bar distributes the matrices into the channels 30 and 31, in which they slide downward by their own weight to the end of the magazine, where they are stopped by the hooks 35 36 of the detents 32 33. If by striking a key-lever of the keyboard 8—for instance, of the lever carrying the letter "a"—the rod 42 is lifted, the rod 34 will under the influence of the spring 37 move in the direction of the arrow, Fig. 4, the hooks 35 36 leave channels 30 31, and all the front matrices 28' 29', carrying the letter "a" of all the magazines, will be released. At the same time through the rotation of the detents 32 33 about the pins 38 39 the chamfered surfaces 42 43 of the detents 32 33 enter the channels 30 31, whereby the remaining matrices of all the magazines are prevented from falling. In order, however, that on striking the key-lever *a* only one matrix "a" of one sort is released between the magazines before the exit of the channels, a stop 9 is arranged provided with projections 40 41, which latter press back the matrices of the released magazine—e. g., the magazine 1—for a short distance, so that between the detents 35 and the upper rear lug of the matrix 28' a space is left, whereby the detents 32 33 are relieved of the pressure of the matrices resting on them.

What I claim, and desire to secure by Letters Patent, is—

1. A device for distributing and releasing different sorts of matrices, comprising in combination with matrices having eccentric teeth or indents, a device for turning same singly, a distributing-rule, spindles by which the different sorts of matrices are conveyed along at any desired angle on either side of the rule, magazines arranged one behind the other below the distributing-rule to receive said matrices, and releasing devices for the various sorts arranged in and between the magazines for preventing more than one sort of matrix leaving a magazine at once, all substantially as described.

2. The turning device for the matrices, comprising a guide having projections corresponding to the matrices located in a prolongation of the distributing-box, and upon which the matrices are pressed and in consequence of the ascent turned, so that the matrices, according as to whether the indents or teeth lie eccentrically right or left, after leaving the said prolongation of the distributing-box are pushed to the right or left hand side of the distributing-rule, substantially as described.

3. In type-setting machines, a releasing device for the matrices, comprising detents pivoted within the channels of the magazines and devices connecting same, whereby on depressing a lever-key the matrices bearing the letter corresponding to said key in each magazine are set free, and control devices located below the exit-opening of the channels for preventing any matrix from being released except those of the magazine set free by said control devices, substantially as described.

4. In type-setting machines, in combination with a releasing device having detents located within the magazine-channels, a device for controlling the exits of said channels, comprising a pivotal plate having projections and means for actuating same, said projections retreating the matrices for a short distance so that between the detent and the lugs of the matrices a space is formed and the detents relieved of the pressure of the matrices, substantially as described.

In witness whereof I have hereunto set my hand in presence of two witnesses.

HENRY B. BARTLETT.

Witnesses:
　WOLDEMAR HAUPT,
　HENRY HASPER.